(No Model.)
J. H. COLEMAN.
AXLE LUBRICATOR.
No. 329,816. Patented Nov. 3, 1885.
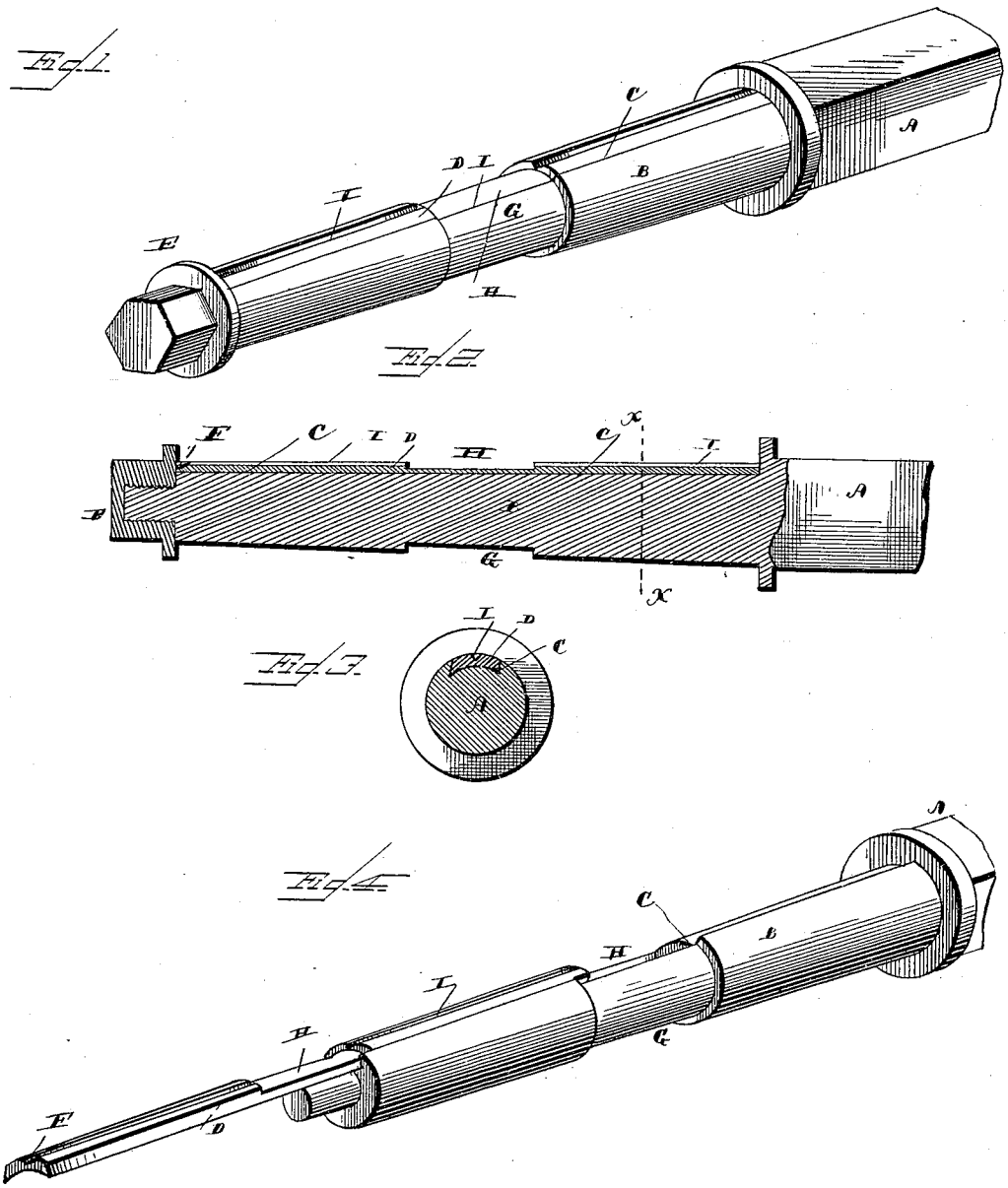
WITNESSES
F. L. Ourand
Arthur J. Mrisell
James H. Coleman
INVENTOR,
By Louis Bagger & Co
Attorneys.

UNITED STATES PATENT OFFICE.

JAMES HENRY COLEMAN, OF MONTROSE, MISSOURI.

AXLE-LUBRICATOR.

SPECIFICATION forming part of Letters Patent No. 329,816, dated November 3, 1885.

Application filed September 12, 1885. Serial No. 176,935. (No model.)

*To all whom it may concern:*

Be it known that I, JAMES H. COLEMAN, a citizen of the United States, and a resident of Montrose, in the county of Henry and State of Missouri, have invented certain new and useful Improvements in Axle-Lubricators; and I do hereby declare that the following is a full, clear, and exact description of the invention, which will enable those skilled in the art to which it appertains to make and use the same, reference being had to the accompanying drawings, which form a part of this specification, and in which—

Figure 1 is a perspective view of my improved axle-lubricator. Fig. 2 is a longitudinal vertical sectional view of the same. Fig. 3 is a vertical transverse sectional view taken on the line $x\ x$ in Fig. 2, and Fig. 4 is a perspective view showing the slide withdrawn from the spindle.

The same letters refer to the same parts in all the figures.

This invention relates to lubricating devices for vehicle-axles; and it has for its object to provide a lubricating device which shall be integral with the axle-spindle, which shall be simple and inexpensive in construction, which shall admit of the lubricating material being readily supplied at any time without necessity for removing the wheels from the axle, which shall be so constructed that waste of the lubricating material shall be avoided, and which shall be generally efficient and easily manipulated.

With these ends in view the invention consists in the improved construction, arrangement, and combination of parts, which will be hereinafter fully described, and particularly pointed out in the claims.

In the drawings hereto annexed, A designates the end of a vehicle-axle, of ordinary construction, and B is the spindle. The latter is provided in its upper side with a longitudinal recess, C, having beveled or dovetailed sides, and extending through the entire length of the said spindle. In this recess or groove is fitted a slide, D, which completely fills the said recess, and which is retained in position therein by the flanged nut E on the outer end of the spindle. The slide D is provided at its outer end with a notch, F, into which, when the nut E is removed, the end of a suitable pointed tool may be inserted, whereby the said slide may be readily withdrawn from the recess. Formed about centrally upon the spindle B is an annular groove, G, which registers with a transverse recess, H, in the upper side of the slide D. The latter is also provided with a longitudinal groove, I, intersecting the recess H, and extending through the entire length of the said slide.

The operation of the invention is as follows: When it shall be desired to apply lubricating material to the spindles without removing the wheels of a vehicle, it is only necessary to remove the flanged nuts at the outer ends of the spindles, thereby enabling the slides to be withdrawn. Oil or suitable lubricating material may then be easily applied into the recess C, into which the slide is then again forced, thus forcing the lubricant through the recesses or grooves I H of the slide and into the groove G of the spindle, from whence, after the application of the nut and when the wheel begins to revolve, it will be evenly distributed over the entire surface of the spindle.

The advantages of this invention will be readily appreciated by those who are familiar with this class of devices. The lubricating material may be conveniently supplied to the axle-spindles at any time and without removing the wheels, which, especially when the vehicle is loaded, is sometimes very difficult and even dangerous of accomplishment.

The construction of the device is simple in the extreme, and the cost of the spindles will not be greatly increased. It will also be seen that waste of the lubricating material is avoided, inasmuch as it is not applied in excessive quantities, and after the slide D has been reinserted into its groove, the latter is closed in such a manner as to prevent the lubricating material from escaping in any direction, except over the bearing of the spindle.

In the practical manufacture of this invention it may be sometimes found desirable to adopt several minor changes in the construction and arrangement of details, and in order to provide for such cases I would have it understood that I do not limit myself to the precise construction and arrangement of parts herein shown and described, but reserve to myself the right to all modifications which may be resorted to without departing from the spirit of my invention.

Having thus described my invention, I claim and desire to secure by Letters Patent of the United States—

1. In an axle-lubricating device, the combination, with a spindle having a longitudinal groove and an annular groove or recess located about centrally upon the said spindle and intersecting the said longitudinal groove, of a slide fitted in the said longitudinal groove and removable from the outer end of the spindle, said slide being provided with a longitudinal groove in its upper or outer side, substantially as and for the purpose herein set forth.

2. In an axle-lubricating device, the combination, with a spindle having a longitudinal groove or recess and an annular groove intersecting the same, of a slide fitted in the said longitudinal groove or recess and removable from the outer end of the spindle, said slide being provided in its upper or outer side with a longitudinal groove, and with a transverse groove or recess intersecting the same and registering with the annular groove in the spindle, substantially as and for the purpose herein set forth.

3. In an axle-lubricating device, the combination of a spindle having a longitudinal groove or recess and an annular groove intersecting the same, a slide fitted in the said longitudinal groove or recess and removable from the outer end of the spindle, said slide being provided in its upper or outer side with a longitudinal groove, and with a transverse groove or recess intersecting the same and registering with the annular groove of the spindle, and having a notch in its upper side, near its outer end, and the flanged nut upon the end of the spindle, whereby the said slide is normally retained in position in the groove of the spindle, substantially as and for the purpose herein set forth.

4. The combination, with a longitudinally-grooved axle-spindle, of a longitudinally and transversely grooved slide adapted to fit closely in the groove of the said spindle and removable from the outer end of the latter, substantially as and for the purpose herein shown and specified.

In testimony that I claim the foregoing as my own I have hereunto affixed my signature in presence of two witnesses.

JAMES HENRY COLEMAN.

Witnesses:
J. B. MAKAY,
B. E. THOMPSON.